US012280387B1

(12) United States Patent
Youdovin et al.

(10) Patent No.: US 12,280,387 B1
(45) Date of Patent: Apr. 22, 2025

(54) CLEANING DISPENSER AND MOUNTING STATION

(71) Applicant: Everybody Cleanup, P.B.C., New York, NY (US)

(72) Inventors: David N. Youdovin, New York, NY (US); Karl Winkler, New York, NY (US); David Wolbert, New York, NY (US); Michael Cronin, New York, NY (US)

( * ) Notice: Subject to any disclaimer, the term of this patent is extended or adjusted under 35 U.S.C. 154(b) by 0 days.

(21) Appl. No.: 18/481,354

(22) Filed: Oct. 5, 2023

(51) Int. Cl.
*B05B 11/00* (2023.01)
*B05B 9/00* (2006.01)
*B05B 12/00* (2018.01)

(52) U.S. Cl.
CPC .............. *B05B 12/002* (2013.01); *B05B 9/00* (2013.01)

(58) Field of Classification Search
CPC ................................ B05B 12/002; B05B 9/00
See application file for complete search history.

(56) References Cited

U.S. PATENT DOCUMENTS

| | | | | | |
|---|---|---|---|---|---|
| 610,127 | A * | 8/1898 | Durafort | B67D 1/0412 | 222/399 |
| 629,752 | A * | 7/1899 | Murray | B67D 1/0456 | 261/DIG. 7 |
| 2,172,035 | A * | 9/1939 | Roth | B01F 23/23611 | 261/DIG. 1 |
| 2,822,002 | A * | 2/1958 | Mack | B65D 83/64 | 222/399 |
| 3,618,669 | A * | 11/1971 | Sachs | A62C 13/006 | 169/85 |
| 4,473,174 | A * | 9/1984 | Heuser | B67D 1/0885 | 215/311 |
| 4,638,927 | A * | 1/1987 | Morane | B65D 51/2821 | 604/91 |
| 4,759,525 | A * | 7/1988 | Cross | B60N 3/103 | 248/346.11 |
| 5,368,203 | A * | 11/1994 | Friedrich | A47J 47/04 | 211/DIG. 1 |
| 7,051,907 | B2 | 5/2006 | Brincat | | |
| 10,682,658 | B1 | 6/2020 | Youdovin | | |
| 10,766,045 | B1 | 9/2020 | Youdovin | | |
| 10,925,458 | B2 | 2/2021 | Youdovin | | |
| 11,359,952 | B2 | 6/2022 | Youdovin | | |
| 11,890,628 | B1 * | 2/2024 | Youdovin | B05B 11/1042 | |
| 2009/0095822 | A1 * | 4/2009 | Chen | B05B 11/0056 | 239/302 |
| 2009/0101680 | A1 * | 4/2009 | Laws | B65D 83/666 | 222/400.7 |
| 2014/0346193 | A1 * | 11/2014 | Conway | B05B 11/007 | 222/173 |
| 2015/0352571 | A1 * | 12/2015 | Petkus | C11D 17/041 | 222/1 |
| 2018/0133724 | A1 * | 5/2018 | Fabrizio | B05B 1/06 | |

* cited by examiner

*Primary Examiner* — Bob Zadeh
(74) *Attorney, Agent, or Firm* — Alston & Bird LLP

(57) ABSTRACT

Methods apparatuses, systems, and/or the like are provided. An example dispenser may include a housing body. An example housing body may include a recess configured for receiving a liquid at least partially therein. The recess may be further configured with a retaining-ejecting mechanism. An example housing body may also include a dispensing mechanism configured for dispensing fluid from a reservoir of the dispenser. An example dispenser may also include a base body. The base body may define a reservoir configured for receiving and maintain fluid therein.

20 Claims, 13 Drawing Sheets

CLEANING DISPENSER AND MOUNTING STATION

TECHNICAL FIELD

Various embodiments generally relate to a dispenser for dispensing solutions, such as cleaning solutions. For example, various embodiments, relate to dispensers that engage with a housing station.

BACKGROUND

In general, a user may wish to have a cleaning dispenser dispense a variety of different solutions to clean different surfaces as well as convenient storage. For example, a user may wish to have a solution to clean glass, a genal-purpose cleaner, a bathroom cleaner, and/or the like but not have to have the conventional storage of cleaning dispensers. The user may want an easy-to-use dispenser that is easy to access.

BRIEF SUMMARY

In general, embodiments of the present disclosure provide methods, apparatuses, systems, and/or the like.

Various embodiments of the present disclosure may include a dispenser. In some embodiments, the dispenser may include a housing body. In some embodiments, the housing body may include a recess configured for receiving a liquid at least partially. In some embodiments, the recess may be further configured with a retaining-ejecting mechanism. In some embodiments, the housing body may also include a dispensing mechanism that may be configured for dispensing fluid from a reservoir of the dispenser. In some embodiments, the dispenser may further include a base body. In some embodiments, the base body may be configured to define a reservoir configured for receiving and maintain fluid therein.

In some embodiments, the dispensing mechanism may further comprise a housing. In some embodiments, the housing may include a nozzle coupled to the housing and may be configured to dispense fluid. In some embodiments, the housing may also include at least one pipette. In some embodiments, the housing further includes a trigger mechanism. In some embodiments, the trigger mechanism may include a trigger handle, a trigger pivot point, a trigger spring, and a plunger mechanism. In some embodiments, the plunger mechanism may be configured to force a cleaning solution from a base coupled to the housing into a holding area upon release of the trigger. In some embodiments, the plunger mechanism may also be configured to force the cleaning solution from the holding area, through an atomization area, and out of the nozzle upon activation of the trigger handle. In some embodiments, the trigger handle and the nozzle are disposed on opposite sides of the housing.

In some embodiments, the pipette may be configured to translate to the base of the reservoir to transport fluids. In some embodiments, the trigger mechanism may be configured to pivot about a pin. The pin may be disposed below the lowermost edge of the nozzle. In some embodiments, the pipette may be configured to transport cleaning solution to the atomization zone. In some embodiments, the recess may be configured to receive liquid. The liquid may be transported via a channel to the reservoir.

In some embodiments, the retaining-ejecting mechanism may include at least one seal. The seal may be configured to keep fluids from exiting the reservoir unintentionally. In some embodiments, the retaining-ejecting mechanism may also include at least one insert guide. The guide may be configured to assist the insertion of a pod into the recess. In some embodiments, the retaining-ejecting mechanism may also include at least one spring. In some embodiments, the retaining-ejecting mechanism may further include at least one spring retainer. The spring retainer may be configured to lock the spring in place when pressed downwards a first time and release the spring when pressed downwards a second time.

In some embodiments, a pod containing a containing a concentrated cleaning medium may be punctured via at least one puncturing device when inserted into the recess. The at least one puncturing device may be a sharp edge device. In some embodiments, the puncturing of the pod may release the contained concentrated medium into the reservoir of the dispenser. In some embodiments, the released concentrated cleaning medium may be deconcentrated and/or diluted into a cleaning solution when mixed with liquid in the reservoir. In some embodiments, the dispenser may be configured to expel the cleaning solution from the reservoir via at least one pipette.

In some embodiments, the housing may further comprise a view window. The viewing window may be configured to allow a user to determine the maximum fill of the reservoir with a liquid. In some embodiments, the housing and the base may be two separate bodies. The two bodies may comprise of one or more magnetic materials. In some embodiments, the base body may further comprise a slip resistant material. The slip resistant material may be configured to provide stability to the dispenser on surfaces.

In some embodiments, an attachment mechanism to attach a housing body to the base body may be configured as part of the design of the housing. In some embodiments, an attachment mechanism to attach the housing body to the base body may be configured as part of the design of the base. In some embodiments, an attachment mechanism to attach the housing body to the base body may be configured independently from either the design of the housing body and/or the design of the base body to operate as a singular mechanism configured to attach the housing body to the base body without regard to the design of the housing body and/or the design of the base body. In some embodiments, the attachment mechanism may be treaded, snap-fit, and/or magnetic.

In some embodiments, the retaining-ejecting mechanism may comprise a first seal and a second seal. The second seal may be disposed at the bottom recess wall within the recess. The first seal may be disposed above the second seal within the recess. The first and the second seal may be configured to prevent fluid from expelling from the recess and/or reservoir. In some embodiments, the retaining-ejecting mechanism may also include a spring. In some embodiments, the retaining-ejecting mechanism may also include a spring retainer. The spring retainer may be designed with a cam profile configured to pivot when first pressed downward in a unidirectional motion, lock within a feature of the chamber wall, and release the spring force pressed downward a second time in a unidirectional motion. In some embodiments, the retaining-ejecting mechanism may also include an insert guide. In some embodiments, the retaining-ejecting mechanism may further include a puncturing device. The puncturing device may be configured to puncture the pod inserted in the recess.

Various embodiments of the present disclosure may include a dispenser system. In some embodiments, the dispenser system may include a dispenser. In some embodiments, the dispenser system may further include a storage element. The storage element may be configured to engage with the dispenser and a surface for storage.

In some embodiments, the storage element may further comprise one or more securing elements. In some embodiments, the storage element may also include one or more magnets. In some embodiments, the storage element may further include one or more storage recess. The storage recess may be configured to receive a trigger handle of the dispenser. In some embodiments, the one or more magnets are configured to engage with the magnetic surface of the dispenser and/or trigger handle of the dispenser.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

The following drawings are illustrations of a particular embodiment of the present disclosure and therefore do no limit the scope of the present disclosure. The drawings are not necessarily drawn to scale and are intended for use in conjunction with the explanation in the following detailed description.

DETAILED DESCRIPTION OF EXAMPLE EMBODIMENTS

Figure 1:
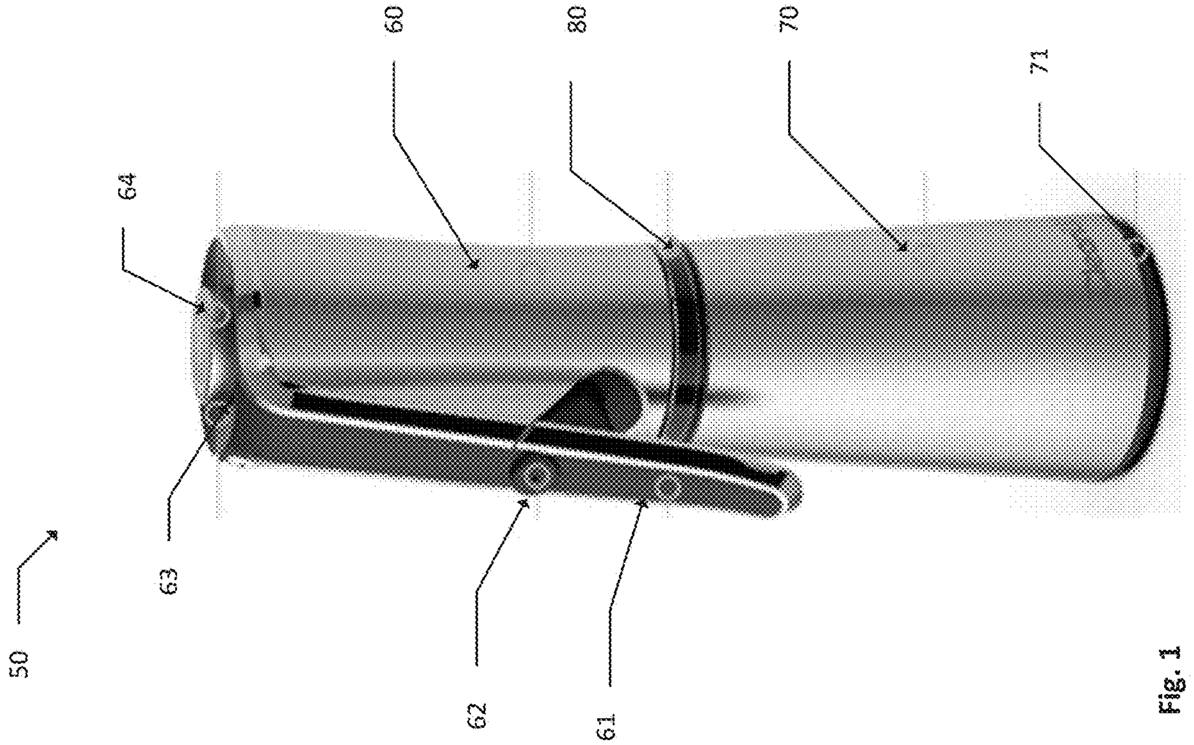
FIG. 1 illustrates a perspective overview of a dispenser in accordance with various embodiments of the present disclosure.

Some embodiments of the present invention will be described in a more detailed manner hereinafter with reference to the accompanying drawings, in which some, embodiments of the invention are shown. Reference numbers refer to like elements throughout the drawings. Multiple embodiments of the current invention may be embodied in different forms and should not be limited to the embodiments set forth herein. Rather, these embodiments are provided so that this disclosure will satisfy applicable legal requirements.

As used herein, terms such as "front," "rear," "top," etc. are used for explanatory purposes in the examples provided below to describe the relative positions of certain components or portions of components. As used herein, the term "or" is used in both the alternative and conjunctive sense, unless otherwise indicated. The term "along," and similarly utilized terms, means near or on, but not necessarily requiring directly on an edge or other referenced location. The terms "approximately," "generally," and "substantially" refer to within manufacturing and/or engineering design tolerances for the corresponding materials and/or elements unless otherwise indicated. The use of such terms is inclusive of and is intended to allow independent claiming of specific values listed. Thus, use of any such aforementioned terms, or similarly interchangeable terms, should not be taken to limit the spirit and scope of embodiments of the present invention. As used in the specification and the appended claims, the singular form of "a," "an," and "the" include plural references unless otherwise stated. The terms "includes" and/or "including," when used in the specification, specify the presence of stated feature, elements, and/or components; it does not preclude the presence or addition of one or more other features, steps, operations, elements, components, and/or groups thereof.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment. As used herein, the terms "example," "exemplary," and the like are used to "serving as an example, instance, or illustration." Any implementation, aspect, or design described herein as "example" or "exemplary" is not necessarily to be construed as preferred or advantageous over other implementations, aspects, or designs. Rather, use of the terms "example," "exemplary," and the like are intended to present concepts in a concrete fashion.

The figures are provided to illustrate some examples of the invention described. The figures are not to limit the scope of the present embodiment of the invention or the appended claims. Aspects of the example embodiment are described below with reference to example applications for illustration. It should be understood that specific details, relationships, and methods are set forth to provide a full understanding of the example embodiment. One of ordinary skill in the art recognize the example embodiment can be practice without one or more specific details and/or with other methods.

The present disclosure relates to a dispenser configured to receive a plurality of pods contained concentrated cleaning solutions, wherein the dispenser is configured to engage with a storage element. Various devices and methods are also provided. In some example embodiments, the dispenser disclosed herein may be used to attach a dispenser with a storage element. Various dispensers typically have a reservoir configured for one certain cleaning solution as well are not configured to be stored in a convenient manner. For example, typical dispensers occupy a vast amount of space for storage due to having different dispensers for different cleaning surfaces and inconvenient storage of said dispensers.

Embodiments of the present disclosure provide a dispenser and/or a storage element, which may facilitate for providing a single dispenser configured for a plurality of cleaning solutions. Various embodiments of the present disclosure may additionally or alternatively allow a user convenient storage of a dispenser. While some embodiments discussed herein include a dispenser and/or one or more storage elements, these examples should be understood to not limit the overall scope of the disclosure, and the attachment mechanism disclosed herein may be used for connecting a dispenser with one or more storage elements that could be engageable and disengagable for each other by a user.

Embodiments of the present disclosure may operate to allow for convenient storage, easy disengagement of a dispenser from a storage element, in some instance, without removing the storage element from one or more mounting locations. The dispenser and the storage element may be engaged via an attachment mechanism that rigidly secured the dispenser to the storage element. In some embodiments, the attachment mechanism may include a magnetic system associated with the storage element, with the magnet configured to engage with magnetic surface of a dispenser. In some embodiments, the storage element may be furthered configured with one or more recesses, wherein the one or more recesses may be configured to receive the trigger of a dispenser to further secure the dispenser to the storage element.

The trigger may comprise of a magnetic material and/or be disposed on the front surface of a dispenser. For example, in some embodiments, the trigger may comprise of a stainless-steel alloy, wherein the alloy is a magnetic material configured to engage with one or more magnets. The trigger may thereby engage a storage element via magnetic connection, insertion to the recess, and/or a combination of both. In some embodiments, the recess may be configured to allow the trigger to engage therewith.

FIGS. 1-11C depicts views of example dispenser and storage elements (e.g., dispenser 50 and storage element 700) and portions thereof in accordance with various embodiments of the present disclosure. FIG. 1 depicts an overview of a dispenser 50, which in the depicted embodiments includes a housing body 60 and a base body 70 and associated elements comprised on said bodies. The dispenser 50 may include a housing body 60 configured to engage with a base body 70. The housing body 60 in the depicted embodiments includes at least one trigger 61, at least one nozzle 62, at least one top funnel 63, and at least one pod 64. In some embodiments, a window element 80 may be configured within the housing body 60, wherein the window element 80 may be configured to allow a user to view fill of liquid in a reservoir. With continued reference to FIG. 1, the dispenser may further comprise a base body 70. The base body 70 in the depicted embodiment may include a slip resistant element 71. In some embodiments, the base body may be configured with a window element 80, wherein the window element 80 may be configured to allow a user to view fill of liquid in a reservoir. In one or more embodiments, a housing body 60 may be configured to engage with a base body 70 via a variety of methods described hereinafter. FIG. 1 depicts the top funnel 63 and the recess where the pod 64 is inserted as two separate elements, the top funnel and the recess may be configured as one combined element without departing from the scope of the present disclosure.

Figure 2:
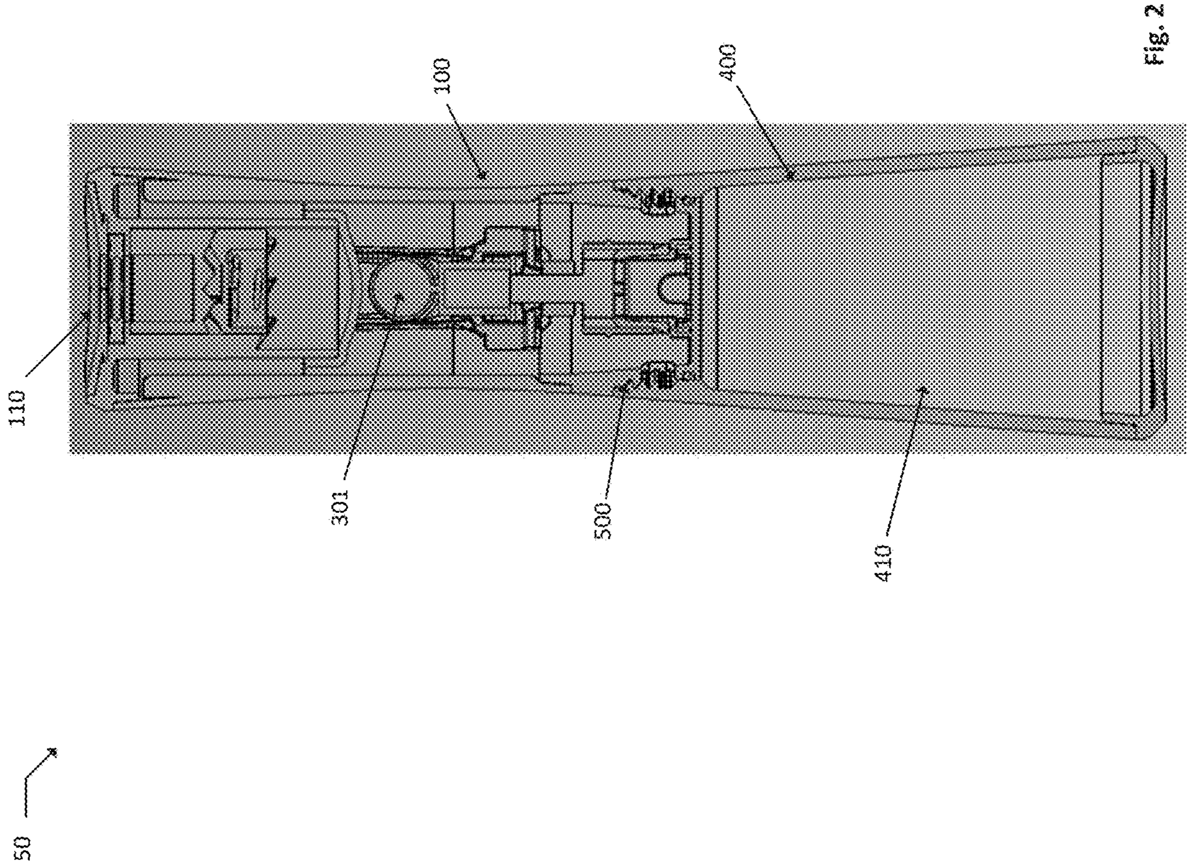
FIG. 2 illustrates a cross-sectional front view of a dispenser in accordance with various embodiments of the present disclosure.
Figure 3A:
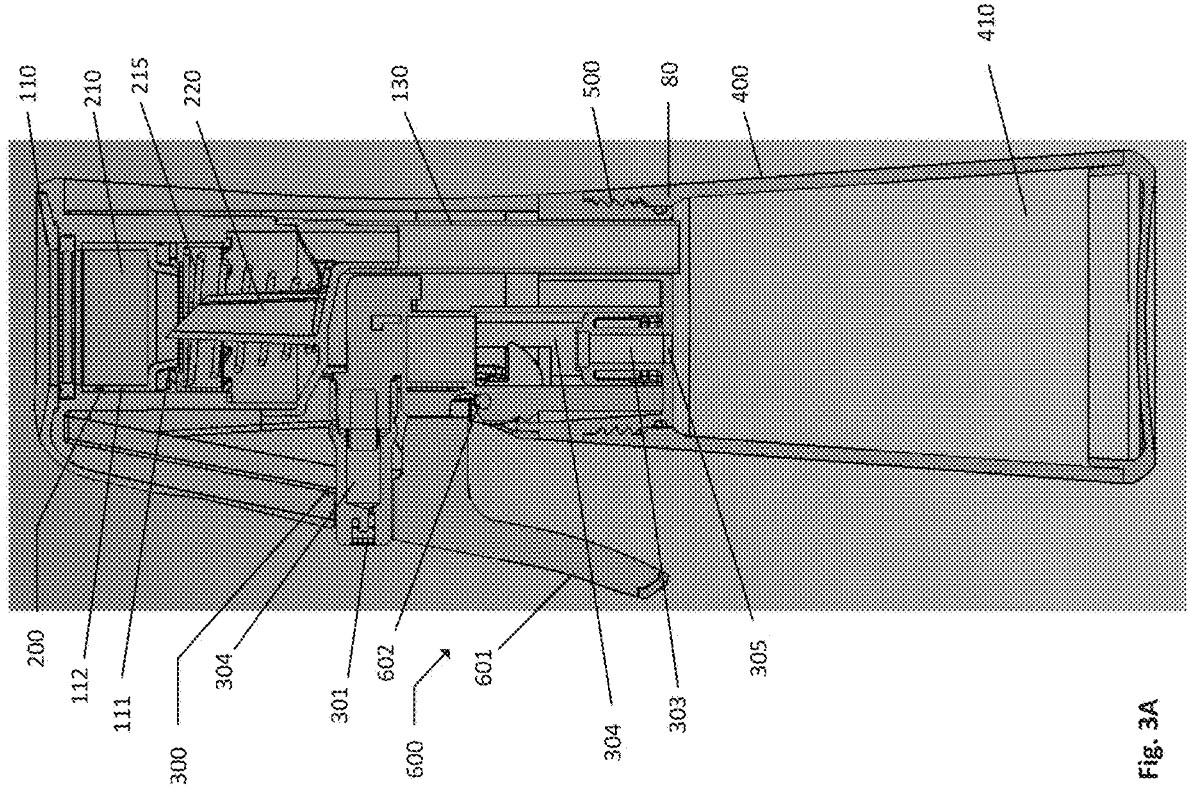
FIGS. 3A-3B illustrate a cross-sectional side view of a dispenser in accordance with various embodiments of the present disclosure.
Figure 3B:
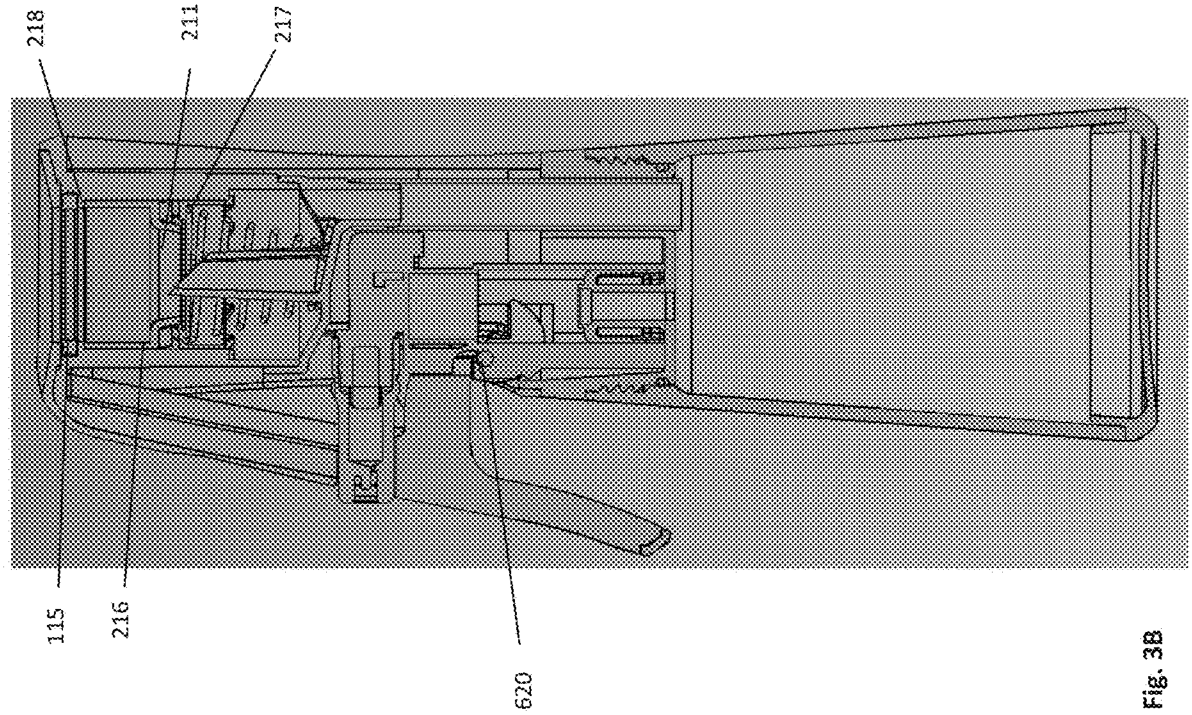

FIGS. 2-3B, each provide cross-sectional view of a respective dispenser 50, according to various embodiments. In various embodiments, a dispenser 50 comprises: a dispenser 100 which is selectively affixed and/or secured to a base 400 via at least one attachment mechanism 500. The at least one attachment mechanism 500 may be designed in a number of different configurations (e.g., threaded, push latch, snap fit, magnetic, etc.). The base 400 at least partially defines a reservoir 410 configured for receiving and maintaining fluid therein.

The dispenser 100 is configured to be coupled to the base 70 via at least one attachment mechanisms 500 so as to enclose the reservoir and/or provide a filling method to the reservoir via a channel. The dispenser 100 includes a recess 110 configured to receive one or more pods 210 at least partially therein. The dispenser 100 also includes a retaining-ejecting mechanism 200 corresponding to and/or coupled to the recess 110. The retaining-ejecting mechanism 200 enables the one or more pod 210 to be inserted into a retained position at least partially within the recess, retained in the retained position, and released from the retained position following designated user input. The pod 210 may be configured to contain a desired amount of concentrated power or fluid.

In various embodiments, a retaining-ejecting mechanism 200 may be incorporated into various dispensers. For example, a retaining-ejecting mechanism 200 may be incorporated into dispensers similar to those disclosed by U.S. Pat. No. 10,682,658, issued Jun. 16, 2020, U.S. Pat. No. 10,766,045, issued Sep. 8, 2020, U.S. Pat. No. 11,359,952, issued Jun. 14, 2022, a floor cleaner similar to that disclosed by U.S. Pat. No. 10,925,458, issued Feb. 23, 2021, and/or other dispensers and/or cleaning devices. The contents of the noted patents are incorporated herein by reference in their entireties. For example, a retaining-ejecting mechanism 200 may be incorporated into the housing body of various types of dispensers and/or cleaning devices such that the retaining-ejecting mechanism 200 may be used to receive one or more pods 210 containing a concentrated cleaning medium and cause the concentrated cleaning medium to be provided to a reservoir of the dispenser and/or cleaning device for dilution and/or use.

Example Housing Body

In example embodiments, the housing body 100 comprises a recess 110. The recess 110 is configured to receive one or more fluids and/or one or more pods 210. The recess 110 may be define at least in part by a lower recess wall 111 and at least one side wall.

In an example embodiment, the recess 110 is defined, at least in part, by a lower recess wall 111, wherein the depth of the lower recess wall 111 may be configured to the desired tolerance of the length of the pod 210.

In an example embodiment, the recess 110 comprises at least one side wall and the lower recess wall 111. The height of the at least one side wall is configured such that when one or more pods 210 is in the retained position, the surface of the one or more pod 210 is approximately flush with a surface of the housing body (as shown in FIG. 5B).

Example Pod

In example embodiments, the one or more pods 210 are configured with at least three sides to form an internal volume. The internal volume may be filled with a concentrated cleaning medium, designed to be released into a fluid to be deconcentrated and/or diluted. The one or more pods 210 may be configured with a puncture location 211. In various embodiments, the puncture location 211 may be design in various fashions (e.g., metallic foil, elastomeric polymer membrane, thin plastic layer, etc.) to provide puncturing of the one or more pods 210 after being depressed into the retaining-ejecting mechanism 200. One or more puncturing devices 220 may be disposed at the lower recess wall 111 in an orientation configured to puncture, at least in part, one or more pods 210. In various embodiments, the one or more puncturing devices 220 may be design in a number of configuration (e.g., needle, sharp edge, blade, blunt edge, tapered edge, and/or the likes).

Exemplary Puncturing Elements

In example embodiments, one or more puncturing devices 220 may be integrated within the design of the lower recess wall 111.

in various embodiments, one or more puncturing devices 220 may be attached separately to the structure of the lower recess wall 111.

In various embodiments, the one or more puncturing devices 220 may be configured to engage and/or puncture one or more surfaces of a pod 210 that is being inserted into the retained position within the recess 110. In one or more embodiments, the one or more puncturing devices 220 may be configured to engage and/or puncture the puncture location 211 of an example pod 210. In various embodiments, the one or more puncturing devices 220 may be, at least in part, partially hollow, wherein the puncturing device 220 may be configured to allow a fluid to flow through at least a portion of the puncturing device 220 into a channel.

Example Puncturing Location

In various embodiments, one or more pods 210 may be configured with a puncturing location 211, wherein the puncturing location 211 may be configured to release the contained concentrated medium within the pod. In various embodiments, the puncture location 211 may be design in a plurality of manners (e.g., metallic foil, elastomeric polymer membrane, thin plastic layer, etc.) to provide puncturing of a pod 210 after and/or as part of being depressed into the recess 110 and being engaged into a retained position by the retaining-ejecting mechanism 200. In various embodiments, one or more puncturing devices 220 may be disposed at the lower recess wall 111 in an orientation configured to puncture, at least in part, the puncture location 211. In various embodiments, the one or more puncturing devices may be designed in a plurality of manners (e.g., needle, sharp edge, blade, blunt edge, tapered edge, and/or the likes). In various embodiments, the at least one puncturing device 220 may be integrated within the design of the lower recess wall 11 or attached separately therein.

Example Fluid Seal

In various embodiments, at least one mechanical connection between the recess 110 and the one or more pods 210 may be lined with a fluid seal 115. In various embodiments, the fluid seal 115 may be configured to prevent one or more fluids from passing in or out of the dispenser 50. For example, the fluid seal(s) 115 are configured to prevent fluid from passing out of the dispenser 50 around the edges of a pod 210 inserted into the recess 110. In various embodiments, the recess may comprise of two or more seals, wherein a first seal 115A may be disposed above a second seal 115B. In some embodiments, the second seal 115 may be disposed at the recess bottom wall 111.

In one or more embodiments, one or more recess walls 112 may be integrated within the housing body 100 to support the fluid seal(s) 115 in a fixed location. In various embodiments, the one or more chamber walls 112 may be affixed with a seal barrier 120 that contains the fluid seal(s) 115 in the fixed location in the scenario the recess wall 112 structure is open to the top of the recess 110. In various embodiments, the seal barrier 120 may be orientated in such a manner that, at least in part, the seal barrier 120 may provide direct contact between the recess 110 and the pod 210, wherein the seal barrier 120 may ensure an adequate seal is provided.

In various embodiments, the seal(s) 115 may be or include a bellows seals, as depicted in FIG. 3A. Within other example embodiments, the seal(s) 115 may be or include an O-ring, gasket seal, and or the like configured to engage one or more walls of a pod 210, as depicted in FIG. 5A. For example, one or more seal(s) 115 may be configured to engage an indentation, ring, or concavity of the pod 210 to aid in retaining the pod 210 within the recess 110 and/or to fluidly seal the recess from the environment about the dispenser 50.

Figure 3C:
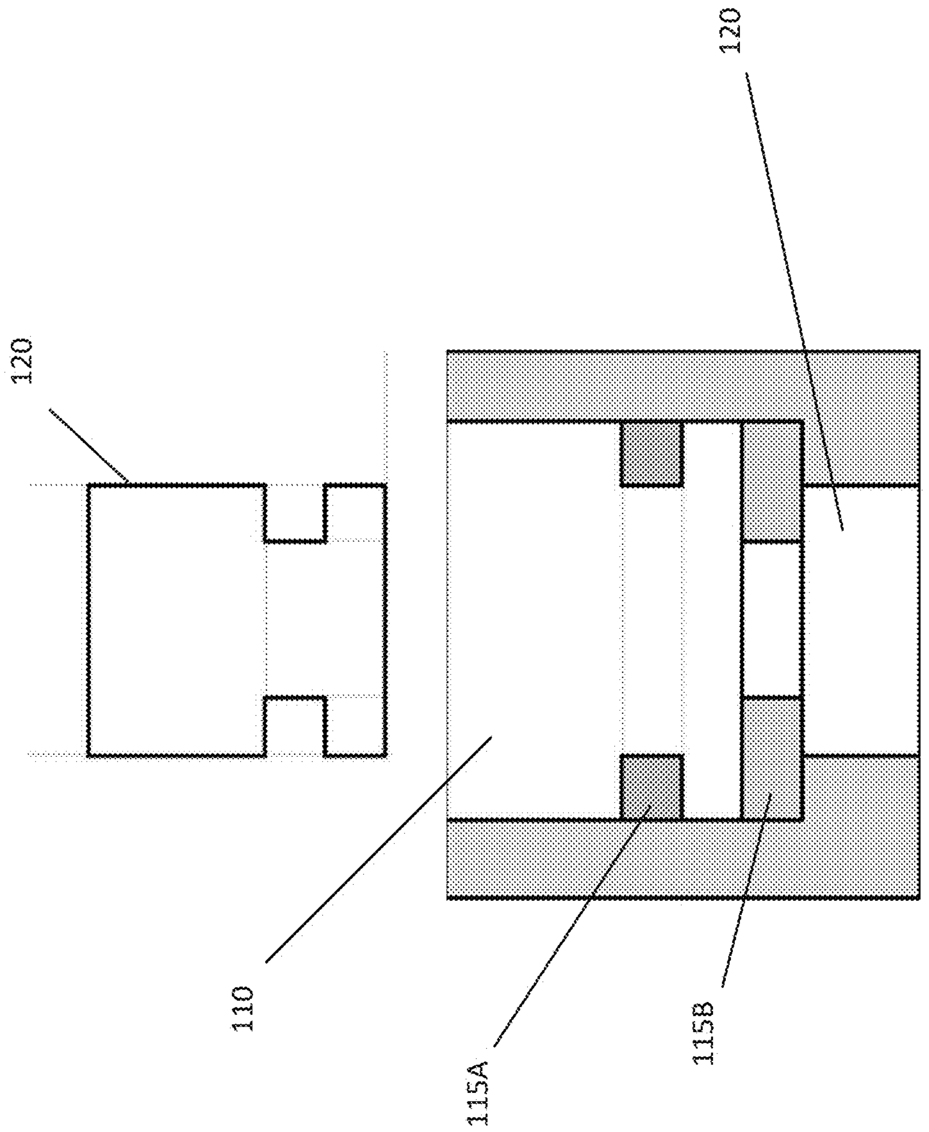
FIG. 3C illustrates a cross-sectional view of an exemplary pod and a receiving recess in accordance with various embodiments of the present disclosure.

With reference to FIG. 3C, in various embodiments, a retaining-ejecting mechanism may contain a first fluid seal 115A and a second fluid seal 115B. In various embodiments, the second fluid seal 115B may be disposed at the bottom recess wall, and the first fluid seal 115A may be disposed above the uppermost edge of the second seal. In various embodiments, the first seal 115A and/or the second seal 115B may be disposed within the recess wall. In various embodiments, the first seal 115A may be configured to keep fluid from expelling from the recess, and the second seal 115B may be configured to keep fluid from expelling the reservoir. In various embodiments, the first seal 115A and/or the second seal 115B may be configured to directly or indirectly engage with a pod inserted into a recess. In one or more embodiments, the first seal 115A and/or the second seal 115B may be configured to maintain the position of the pod within the retaining-ejecting mechanism. In various embodiments, a retaining-ejecting mechanism may comprise just a first seal 115A. The first seal is configured to prevent liquid from exiting the recess 110 when a pod 120 is inserted within a retaining-ejecting mechanism. In various embodiments, the contents of within the pod 120 is configured to flow from within the pod to the reservoir, wherein the seal 115A is configured to prevent contents within the pod 120 from expelling within the retaining-ejecting mechanism.

Example Retaining-Ejecting Mechanism

In various embodiments, a retaining-ejecting mechanism 200 comprises at least one spring 215, at least one insert guide 216, and at least one spring retainer 217. In various embodiments, the retaining-ejecting mechanism 200 may enable a pod 210 to be inserted into a retained position at least partially within a recess 110, retained in the retained position, and released from the retained position. In various embodiments, a retainer 218 may be configured to retain the position of the insert guide 216, wherein the insert guide 216 may provide a known location for at least an empty position, loaded position, retained position, and/or released position. In various embodiments, a seal 115B (depicted in FIG. 3C) may be positioned between the insert guide 216 and the know recess wall 111. The seal 115B may be configured to prevent fluid from flowing from the pod 210 to the reservoir. In various embodiments, the seal 115B (depicted in FIG. 3C) may be a ring shape that is disposed beneath the insert guide 216 and against the recess wall 112. In other embodiments, the seal 115B may be configured to be a rubber boot that is configured to connect the lower recess wall 111 and the insert guide 216. In an instance in which the seal 115B is a rubber boot, the rubber boot seal 115B may be the only seal necessary. In various embodiments, the spring 215 may further comprise a spring release mechanism (not depicted). The spring release mechanism may comprise a button configured to release the spring allowing the pod 210 eject from the retaining-ejecting mechanism 200. In various embodiments, the button for the spring release mechanism may be positioned on the outer shell of the dispenser, wherein a user may be able to engage with button to release the spring.

Example Dispensing Mechanism

In various embodiments, a dispensing mechanism 300 may comprise of a nozzle 301, an atomization area 302, a flow channel 303, a holding area 304, and a dispensing pipette 305. In one or more embodiments, the dispensing mechanism may be configured to direct flow of one or more liquids from the reservoir 410 out of the nozzle 301.

Example Trigger Mechanism

In various embodiments, a trigger mechanism 400 may comprise a trigger handle 601, a trigger spring 602, a trigger mechanism 610, and a trigger structure 620. In various embodiments, the trigger mechanism 600 may be configured to generate a force (e.g., pressure differential, vacuum, and/or the like) to pull the cleaning solution from a reservoir 410 to one or more holding area 304 upon release of the trigger handle 601 and an opposing force to dispense the cleaning solution from the holing area 304 when the trigger handle 601 is pressed. In various embodiments, the releasing of the trigger handle 601 may prime the holding area 304 with additional cleaning solution for the next activation of the trigger handle 601. In various embodiments, a trigger spring 602 may provide a constant tension or compression force against a plunger mechanism 610, which may be disposed within the design of the housing body 100.

Example Dispenser Functionality

In one or more embodiments, a pod 210 containing a concentrated cleaning medium is inserted into the pod recess

110 of the housing body 100. The pod 210 is then pressed into the retained position of the retaining-ejecting mechanism 200 by the user to retain the pod 210 in the housing body 100, and thus releasing the concentrated cleaning medium from the pod 210 into the base 410 reservoir, via a channel 130. Next, the dispenser 50 is shaken to deconcentrate and/or dilute the concentrated cleaning medium with the contents of the base reservoir 410. The trigger mechanism 600 can then be activated to dispense the deconcentrated and/or dilute cleaning solution from the base reservoir 410 and out of the dispensing mechanism 300. After the dosage of contents of the base reservoir 410 have been expelled for the cleaning operation, the pod 210 can be removed and properly disposed. In various embodiments, the pod 210 may be removed by pressing downwardly on the pod to release it from the retaining-ejecting mechanism, by pressing on a spring release button, and/or the like. Finally, the dispenser 50 housing body 100 and base reservoir 410 can be rinsed before storing for the next use.

Example Channel

In various embodiments, a lower recess wall 111 may exist at the bottommost surface of the recess 110. In various embodiments, beneath the lower recess wall 111, at least on channel 130 may exist configured to direct the flow of the concentrated cleaning medium from the recess 110 to the reservoir 410.

In various embodiments, the channel 130 may be configured, at least in part, to be a part of the puncturing device 220. For example, in various embodiments, the puncturing device 220 may be, at least in part, hollow such that the pod medium may be configured to flow through the hollow portion of the puncturing device 220 into the channel 130 and to the reservoir 410.

Example Storage Element

In various embodiments, a storage element 900 may be configured to engage with an example dispenser 50 through various engagement methods. In various embodiments, the storage element may comprise one or magnets 901, one or more adhesive connections 902, and/or one or more storage recesses 910.

Additional Example Embodiments

In various embodiments, as depicted in FIG. 1, the dispenser 50 may comprise of a housing body 60 and a base body 70. In various embodiments, a housing body 60 may be configured to house a retaining-ejecting mechanism 200, dispensing mechanism 300, at least in part an attachment mechanism 500, and a trigger mechanism 600. In various embodiments, the housing body, as depicted in FIG. 1, may further comprise: a trigger 61, a nozzle 62, an opening 63, and a pod 64. In various embodiments, the housing body 60 may comprise of a window element 80, wherein the window element may be configured to allow a user to view the fill of the reservoir.

With further reference to FIG. 1, a dispenser 50 may comprise of a base body 70, wherein the base body 70 may define, at least in part, a reservoir. In various embodiments, the base body may comprise an anti-slipping element 71 disposed on the bottom of the base body 70, wherein the anti-slipping element 71 may be configured to provide extra friction on one or more surfaces. In various embodiments, the base body 70 may further comprise a window element 80, wherein the window element may be configured to allow a user to view the fill of the reservoir. In one or more embodiments, the base body 70 may be configured to engage with the housing body 60 via an attachment mechanism 500.

In various embodiments, the housing body 60 and the base body 70 may comprise of a rigid material. In various embodiments, the housing body 60 and the base body 70 may comprise of the same material. While in other embodiments, the housing body 60 and the base body 70 may comprise of different materials. For example, in various embodiments, the housing body 60 and the base body 70 may comprise of a magnetic material (e.g., stainless steel, aluminum, etc.), wherein the two bodies may be configured to engage with a magnet. In various embodiments, the trigger 61 may comprise of a magnetic material, wherein the trigger 61 may be configured to engage with a magnet of one or more storing elements and/or a recess of one or more storage elements. In various embodiments, the window element 80 may comprise of a transparent material, wherein the transparent material may be configured to allow users to view the reservoir defined, at least in part, by the base body 70. In one or more embodiments, as depicted in FIG. 1, the base body may further comprise an anti-slipping element 71, wherein the anti-slip element 71 may comprise of a different material (e.g., rubber, and/or the like) than the rest of the base body.

In various embodiments, as depicted in FIG. 2, a front cross-sectional area view of an example dispenser may be depicted. In various embodiments, the housing body 100 and the base body 400 may engage via an attachment mechanism (e.g., threaded, push latch, snap fit, magnetic, etc.), wherein the base body 400 may be configured to define a reservoir 410. In various embodiments, the recess 110 may be configured to receive one or more fluids (e.g., water, and/or the like) prior to the insertion of a pod 210 in the recess. In various embodiments, the nozzle 301 may be configured to expel cleaning solution from the reservoir 410.

In various embodiments, as depicted in FIGS. 3A-3B, the dispenser 50 comprises a housing body 100 further comprising: a dispensing mechanism, a trigger mechanism, and an attachment mechanism, and a base body 400. In various embodiments, a pod 210 may be inserted into the recess 110 of the housing body 100 and depressed into the retained position of the retaining-ejecting mechanism 200. In various embodiments, the one or more puncturing devices 220 may pierce the puncturing location 211 of the pod 210, wherein concentration medium expels from the pod 210 to the channel 130.

FIGS. 3A-3B provides a partial cross-sectional side view of the retaining-ejection mechanism of the example embodiment shown in FIG. 2 in a cross-sectional side view, according to various embodiments. In various embodiments, a dispenser 50 comprises the recess 110 of the housing 60 to provide a recess configured for receiving a pod 210 at least partially therein. The pod 210 rests on the insert guide 216 within the recess 110. The insert guide 216 may slide in a unidirectional path to direct the pod 210 in or out of the recess 110. A spring 220 provides a tensile or compression force between the insert guide 225 and the lower recess wall 111. A roller stop prevents the spring 215 from overextending or over compressing the insert guide 216 in the recess 110. At least one insert guide stop marker may exist or be integrated within the design of the insert guide 216 to provide one or more known positions of the insert guide 216.

In various embodiments, the housing body 100 further comprises a dispensing mechanism 300. The dispensing mechanism 300 may be designed in a number of different configurations (e.g., atomizer, pump dispenser, and the like). An atomization area 302 may be configured in the design of the housing body 100 to provide a desired air to cleaning solution ratio or normal flow to a spout in an embodiment where the dispensing mechanism 300 is a pump dispenser. The nozzle 301 may be attached to the housing body 100 via an outlet of the atomization area 302. The outlet may be designed in a number of different configurations (e.g., threaded tube, push latch, snap fit, etc.). The nozzle 301 may also be configured to provide different levels of projection or spray pattern of the cleaning solution as desired.

At the opposing end of the atomization area 302 from the nozzle 301, a flow channel 303 may provide a direction of flow of the cleaning solution from the base reservoir 410 to the dispensing mechanism 300. The cleaning solution may be extracted from the reservoir 410 via a dispensing pipette 305 and trigger mechanism 600. The trigger mechanism 600 generates a force (e.g., pressure differential, vacuum, or the like) to pull the cleaning solution into a holding area 304 upon release of the trigger handle 601 and an opposing force to dispense the cleaning solution from the holding area 304 when the trigger handle 601 in pressed. The releasing of the trigger handle 601 primes the holding area 304 with cleaning solution for the next activation of the trigger handle 601. A trigger spring 602 provides a constant tension or compression force against the plunger mechanism 610 in mechanical connection to the trigger. The trigger mechanism 600 is supported by the trigger structure 620, which may also be configured within the design of the housing body 100.

FIG. 4, FIG. 5, FIG. 6, and FIG. 7 each illustrate different steps in a cycle of receiving, retaining, and ejecting a pod 210 of the retaining-ejecting mechanism 200. In this example embodiment, a spring retainer 217 is included to provide the unidirectional motion of the insert guide 216 through the recess 110. A seal barrier 120 is also included to provide a direct contact patch between the connection of the recess 110 and the pod 210 to ensure an adequate seal is provided. This seal barrier 120 is useful in the scenario the recess wall 112 structure is open to the top of the recess 110.

Figure 4:
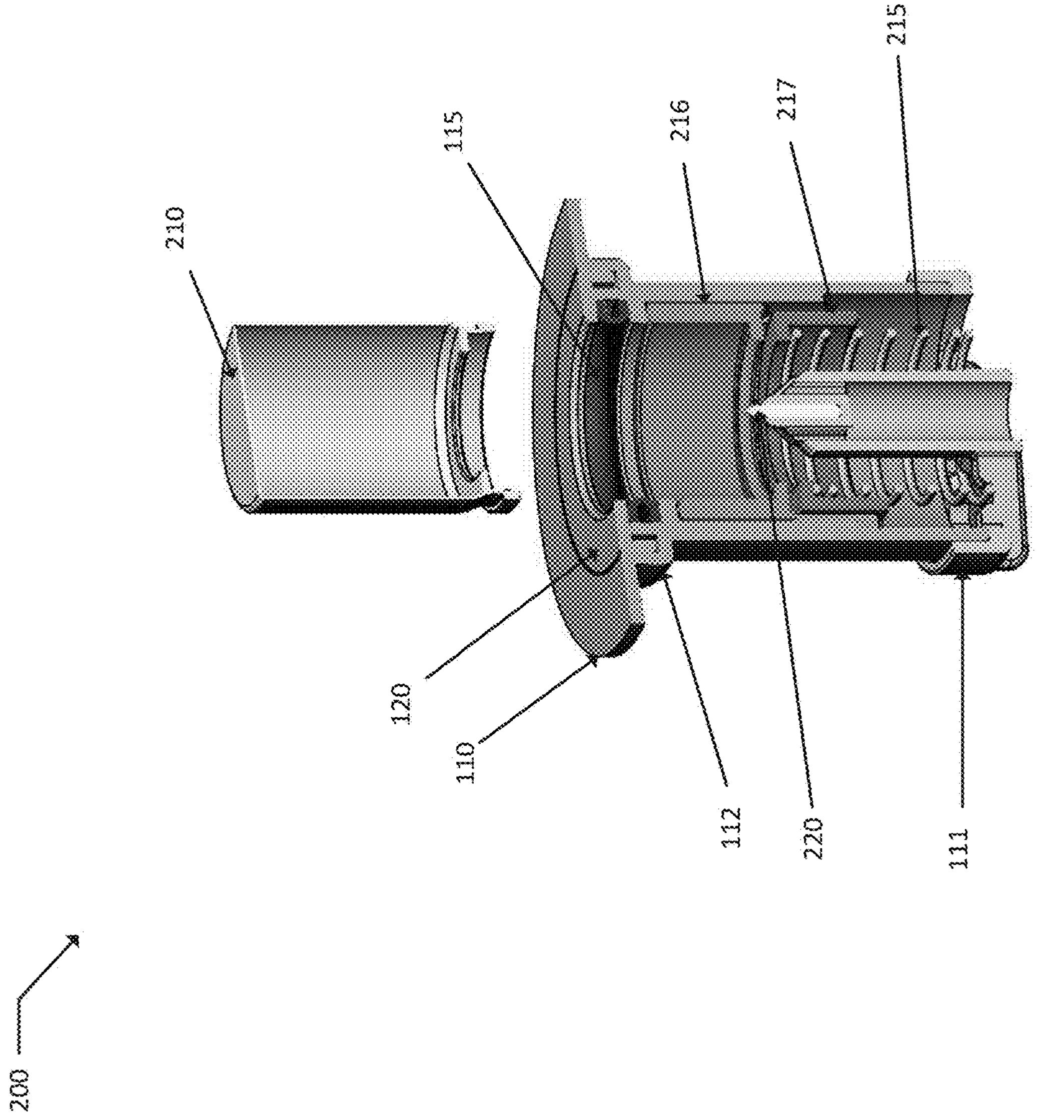
FIG. 4 illustrates a detailed cross-sectional isometric view of the retaining-ejecting mechanism, where the pod is removed from the recess, in accordance with various embodiments of the present disclosure.
Figure 5:
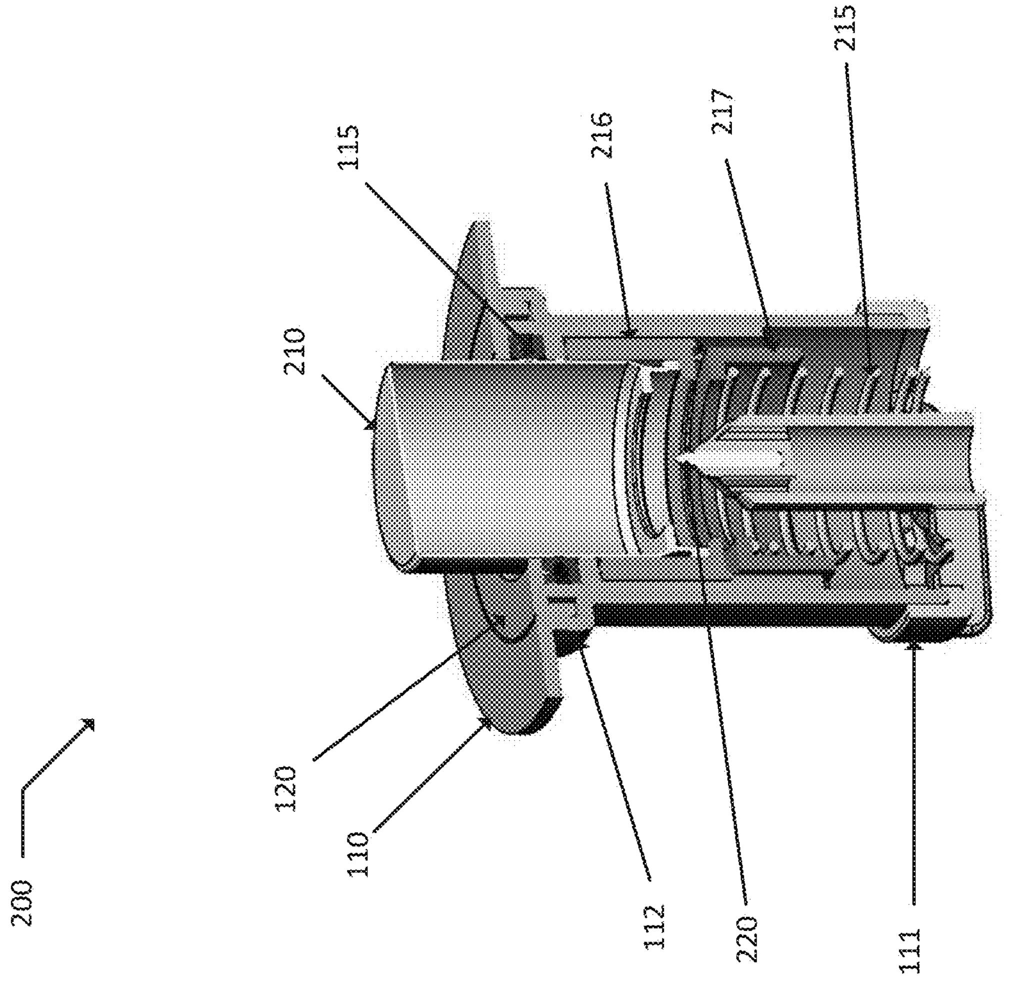
FIG. 5 illustrates a detailed cross-sectional isometric view of the retaining-ejecting mechanism, where the pod is inserted in the recess, in accordance with various embodiments of the present disclosure.

In particular, FIG. 4 illustrates the configuration of an insert guide 216, spring retainer 217, and spring 215 when a cleaning pod 210 is not engaged therewith. FIG. 5 illustrates the cleaning pod 210 engaging with the insert guide 216 as the insert guide 216 begins to engage the spring retainer 217 to cause the compression of the spring 215 as the cleaning pod is pressed into the recess 110.

Figure 6:
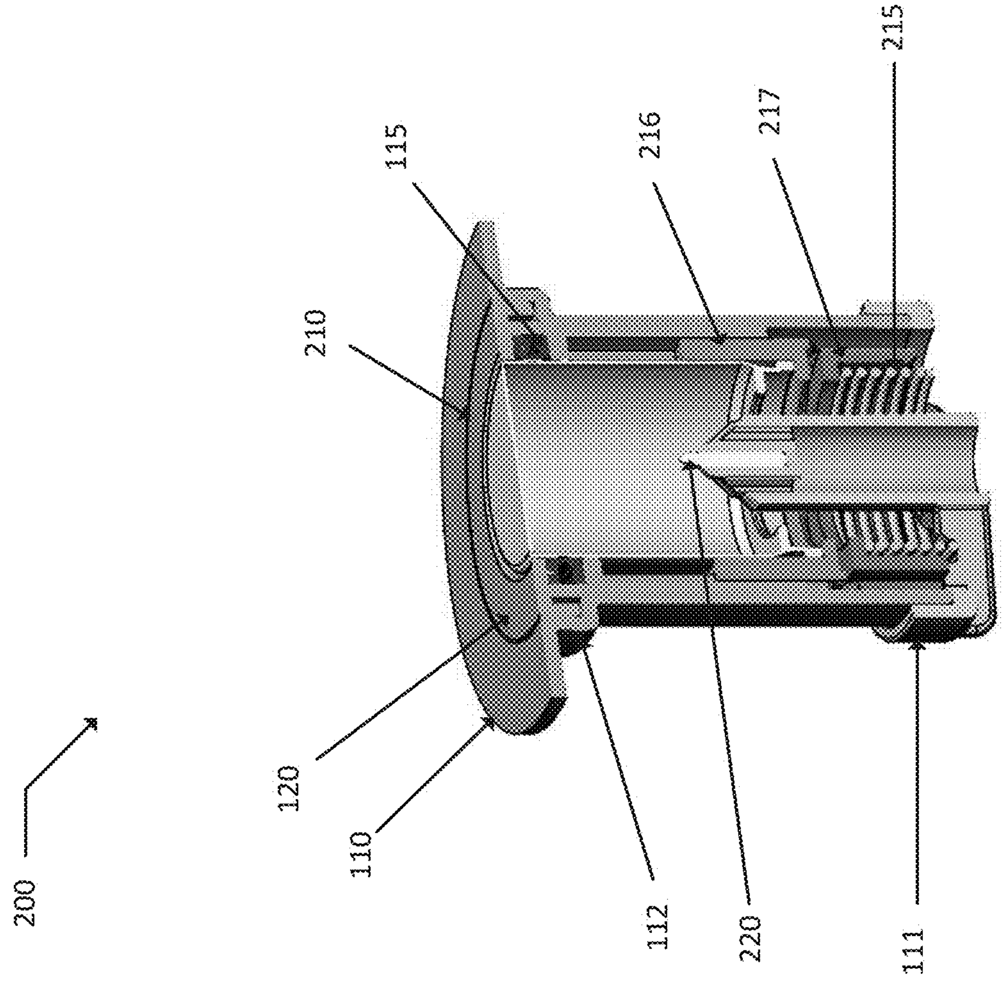
FIG. 6 illustrates a detailed cross-sectional isometric view of the retaining-ejecting mechanism, where the pod is pushed into the retained position in the recess, in accordance with various embodiments of the present disclosure.

FIG. 6 illustrates the configuration of the insert guide 216, spring retainer 217, and spring 215 when the cleaning pod 210 is in the retained position. For example, the insert guide 216 has engaged the spring retainer 217 to cause the spring retainer 217 to compress the spring 215 and to cause the spring retainer 217 to engage with an alcove or compartment in the lower portion of the recess. The engagement of the spring retainer 217 with the alcove or compartment in the lower portion of the recess prevents the compressed spring 215 from being able to push the spring retainer 217 back toward the unengaged position illustrated in FIGS. 4 and 5.

Figure 7:
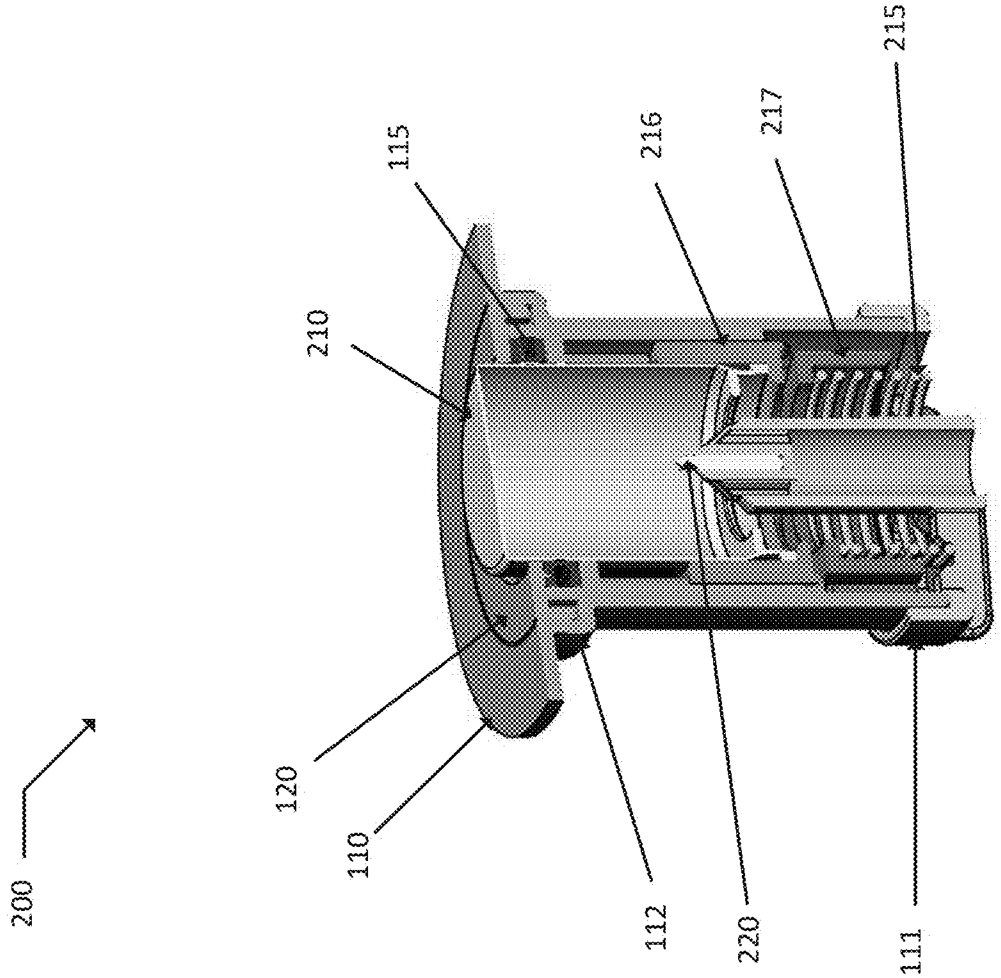
FIG. 7 illustrates a detailed cross-sectional isometric view of the retaining-ejecting mechanism, where the pod is retained in the retained position in the recess, in accordance with various embodiments of the present disclosure.

FIG. 7 illustrates the configuration of the insert guide 216, spring retainer 217, and spring 215 as the spring retainer 217 is released from engagement with the alcove or compartment in the lower portion of the recess 110 such that the spring 215 is able to push the spring retainer 217 (and indirectly the insert guide 216 and pod 210) back toward their respective unengaged positions.

Figure 8B:
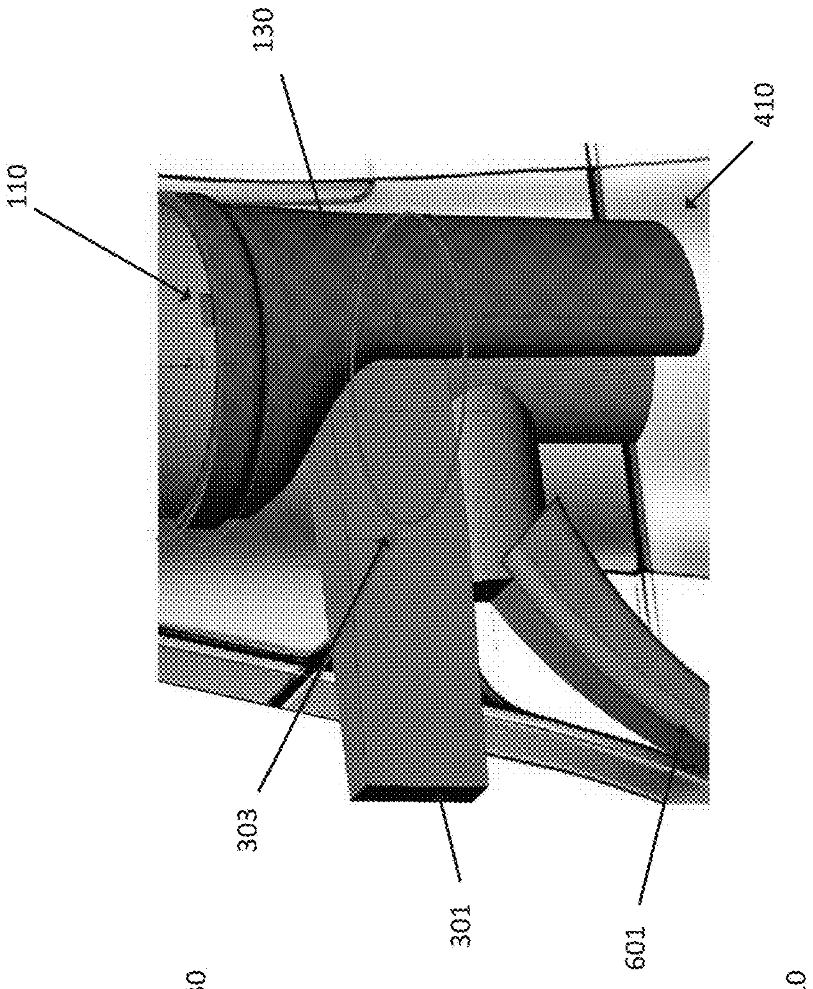
FIG. 8B illustrates a detailed isometric view highlighting the retaining-ejecting mechanism, dispensing mechanism, and trigger mechanism in accordance with various embodiments of the present disclosure.
Figure 8A:
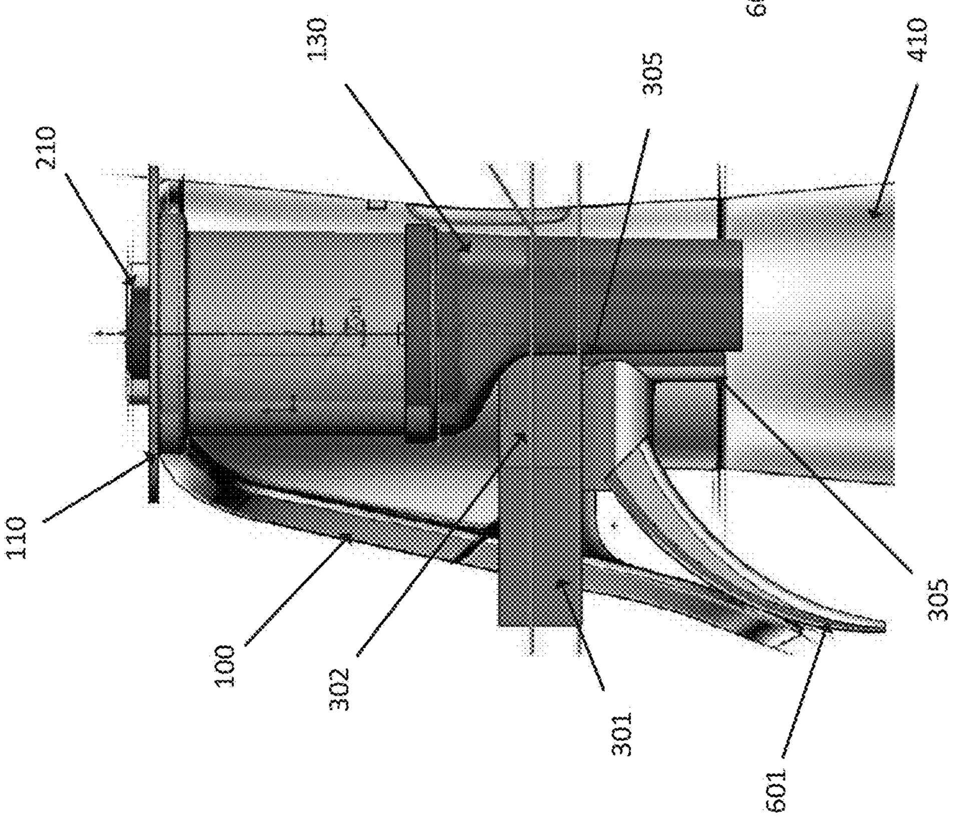
FIG. 8A illustrates a detailed side view highlighting the retaining-ejecting mechanism, dispensing mechanism, and trigger mechanism in accordance with various embodiments of the present disclosure.

The series of FIGS. 8A-8B provides a detailed view of the retaining-ejecting mechanism 200, dispensing mechanism 300, and trigger mechanism 600. In an example embodiment, the at least one channel 130 may be configured to reside within a protective cover to prevent damage to or disconnection of the channel 130 from the lower recess wall 111 of the retaining-ejecting mechanism 200. In an example embodiment, the at least one channel 130 is a large, smoothly shaped drain configured to transfer the concentrated cleaning medium from the pod 210 to the base reservoir 410 without limiting space for the dispensing mechanism 300 and/or trigger mechanism 400. The at least one channel 130 may be configured around the design of the dispensing mechanism 300 and/or trigger mechanism 400 by flowing the concentrated cleaning medium around the perimeter of the internal structure of the housing body 100. In an example embodiment, the at least one channel 130 is configured as a U-shaped tubular flow channel around the dispensing pipette 305 and flow channel 303.

Example embodiments of the present invention provide cleaning pods for storing and providing concentrated cleaning mediums and a dispenser 50 for diluting and/or deconcentrating the concentrated cleaning mediums (e.g., to form a diluted and/or deconcentrated cleaning solution) and dispensing the diluted and/or deconcentrated cleaning solution. FIGS. 3A-3B show an example dispenser mechanism 300 that is an atomizer and example cleaning pod 210 within a dispenser 50 (e.g., atomizer, hand pump, and/or the like) to provide cleaning solution to the dispenser 50. The user may then use the diluted and/or deconcentrated cleaning solution. In an example embodiment, a pod 210 may be configured to contain approximately one cleaning session worth of cleaning mediums for mixing such that when the user is finished cleaning, the user need not store unused cleaning solution.

Example embodiments of the present invention provide an attachment mechanism 500 to attach the housing body 100 to the base body 400. The attachment mechanism 500 may be designed to accommodate threads (e.g., twisted and/or screwed) onto and/or into the design of the housing body 100 and/or base body 400. In an example embodiment, the attachment mechanism 500 is configured as part of the design of the housing body 100. In an example embodiment, the attachment mechanism 500 is configured as part of the design of the base body 400. In an example embodiment, the attachment mechanism 500 is configured independently from either the design of the housing body 100 and/or the design of the base body 400 to operate as a singular mechanism configured to attach the housing body 100 to the base body 400 without regard to the design of the housing body 100 and/or the design of the base body 400.

Figure 9:
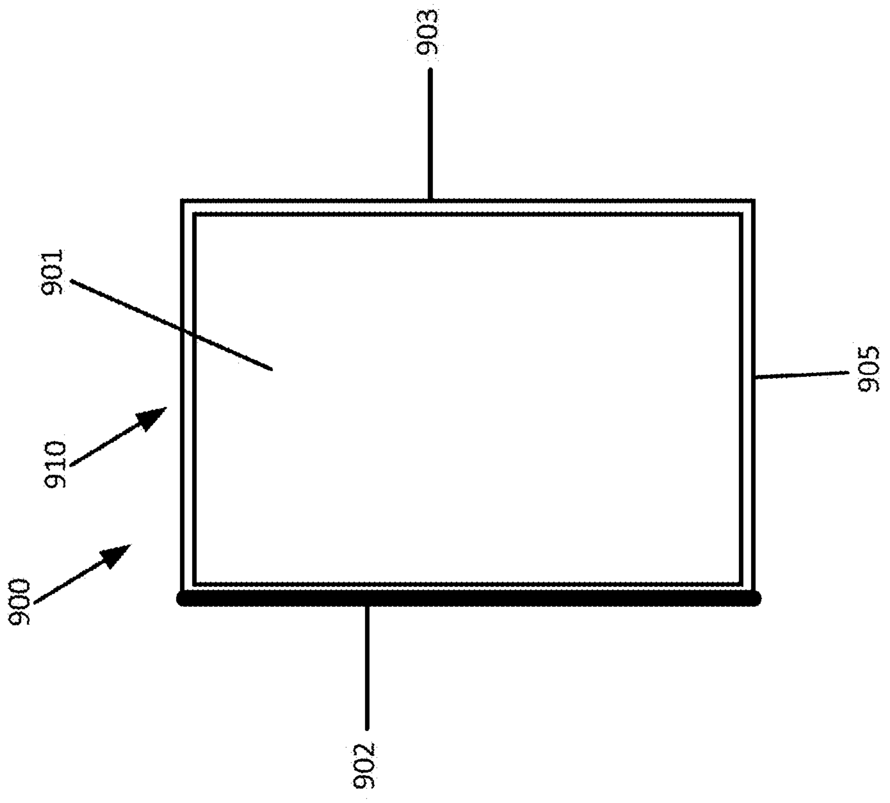
FIG. 9 illustrates a cross-sectional view of an exemplary storage element in accordance with various embodiments of the present disclosure.

With reference to FIG. 9, in accordance with various embodiments, an example storage element 900 is depicted. In various embodiments, the one or more storage elements 900 may be configured to engage with one or more dispensers. In various embodiments, the one or more storage elements 900 may be configured with one or more magnets 901, wherein the one or more magnets 901 are configured to engage with the magnetic material of the one or more dispenser and/or the magnetic material on the trigger handle. While in some other embodiments, the one or more storage elements 900 may further comprise one or more storage recesses 910, wherein the storage recess 910 may be configured to house the trigger handle of one or more dispenser. While in some further embodiments, the one or more storage elements 900 may be configured with one or more magnets 901 and/or one or more storage recesses 910, wherein both the one or more magnet and the one or more store recesses may be configured to engage and/or house the trigger handle comprising of a magnetic material.

In various embodiments, the one or more storage elements 900 may further comprise of a securing element 902, wherein the securing element 902 may be configured to secure the one or more storage elements to a storage surface. In various embodiments, the securing element 902 may be configured to engage with a variety of surfaces (e.g., wood, tile, concrete, quartz, and/or the like). In some embodiments, the one or more securing elements 902 may be an adhesive material, a fastener, etc.

In various embodiments, the one or more storage elements 900 further comprise an engagement element 903. For example, the engagement element is a surface of housing 905. In various embodiments, an engagement element 903 is configured to engage a dispenser.

Figure 10B:
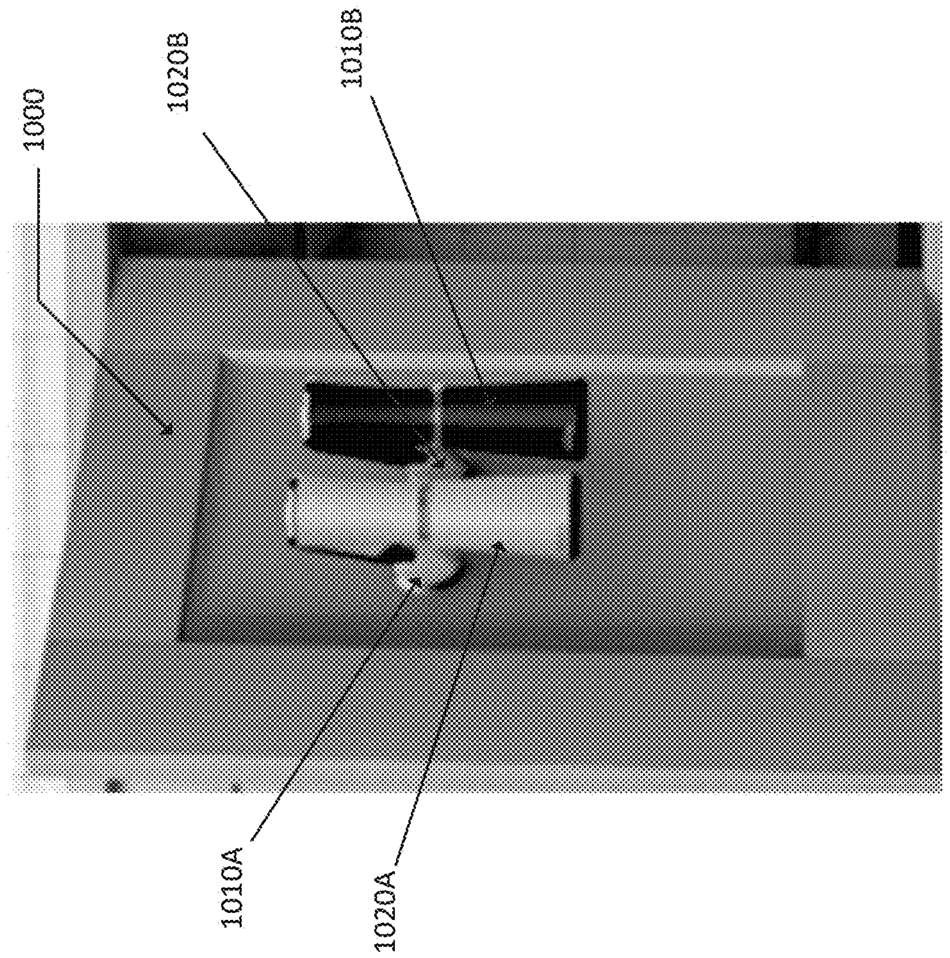
FIGS. 10A-10B illustrates a perspective view of a storage element engaging with a corresponding dispenser in accordance with various embodiments of the present disclosure.
Figure 10A:
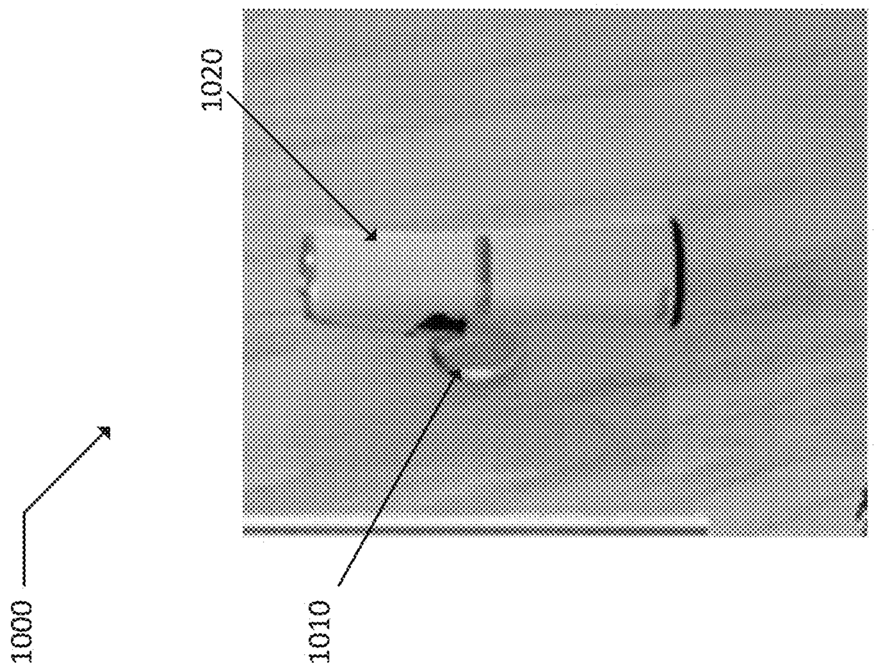

With reference to FIGS. 10A-10B, in accordance with various embodiments, an example dispensing system 1000 is depicted. In various embodiments, the dispensing system 1000 may comprise one or more storage elements 1010, 1010A, and 1010B (collectively "1010") and one or more dispensers 1020, 1020A, and 1020B (collectively "1020"). In various embodiments, as depicted in FIG. 10A, the storage element 1010 may be configured to engage with one or more flat surfaces, wherein the storage element comprises an adhesive element 902 configured to secure the storage element 1010 with a surface. In various embodiments, with further reference to FIG. 10A, the storage element 1010 may be configured to engage with the dispenser 1020 in a variety of manners. For example, in one or more example embodiments, the storage element 1010 may be configured to engage with the dispenser 1020 through a magnetic connection, wherein the storage element 1010 may comprise one or more magnets 901. In various embodiments, the one or more magnets 901 disposed within the storage element 1010 may be configured to engage with magnetic surface of the dispenser 1020. In other example embodiments, the storage element 1010 may be configured to engage and/or securely connect with the dispenser in one or more mechanical manners, wherein the storage element 1010 may comprise of one or more storage recesses 910 (depicted in FIG. 9). For example, in various embodiments, the storage recess 910 (depicted in FIG. 9) may be configured to receive the trigger handle 601 (depicted in FIG. 3A), wherein the engagement between the storage recess 910 and the trigger handle 601 provides a storage connection. In some further example embodiments, the storage element 1010 may be configured to engage and/or securely connect with the dispenser 1020 through a combination of both magnetic connection and trigger handle insertion, wherein the storage element may be configured with one or more magnets 901 at the bottom of the storage recess 910, and the trigger handle 601, configured to engage with the storage recess, comprises a magnetic material, configured to engage with the one or more magnets. In various embodiments, the storage element 1010 may be configured to use various other means for storing the dispenser, such as, a snap mechanism, a lever, gravity, and/or the like. In some embodiments, the trigger handle 601 may be inserted within the storage recess 910, wherein gravity is configured to secure the dispenser within the storage recess 910. In various embodiments, the storage element 1010 may be further configured to store one or more additional pods, cleaning tools, and/or the like.

In various embodiments, with reference to FIG. 10B, a plurality of dispensing systems 1000 may be configured to engage with the same surface. In various embodiments, the plurality of systems 1010 comprises of a plurality of storage elements 1010 and a plurality of dispensers 1020. In various embodiments, as depicted in FIG. 10B, the plurality storage elements 1010 provides a user with the ability to easily store a plurality of dispensers 1020 in a compact and convenient manner.

Figures 11A, 11B, 11C:
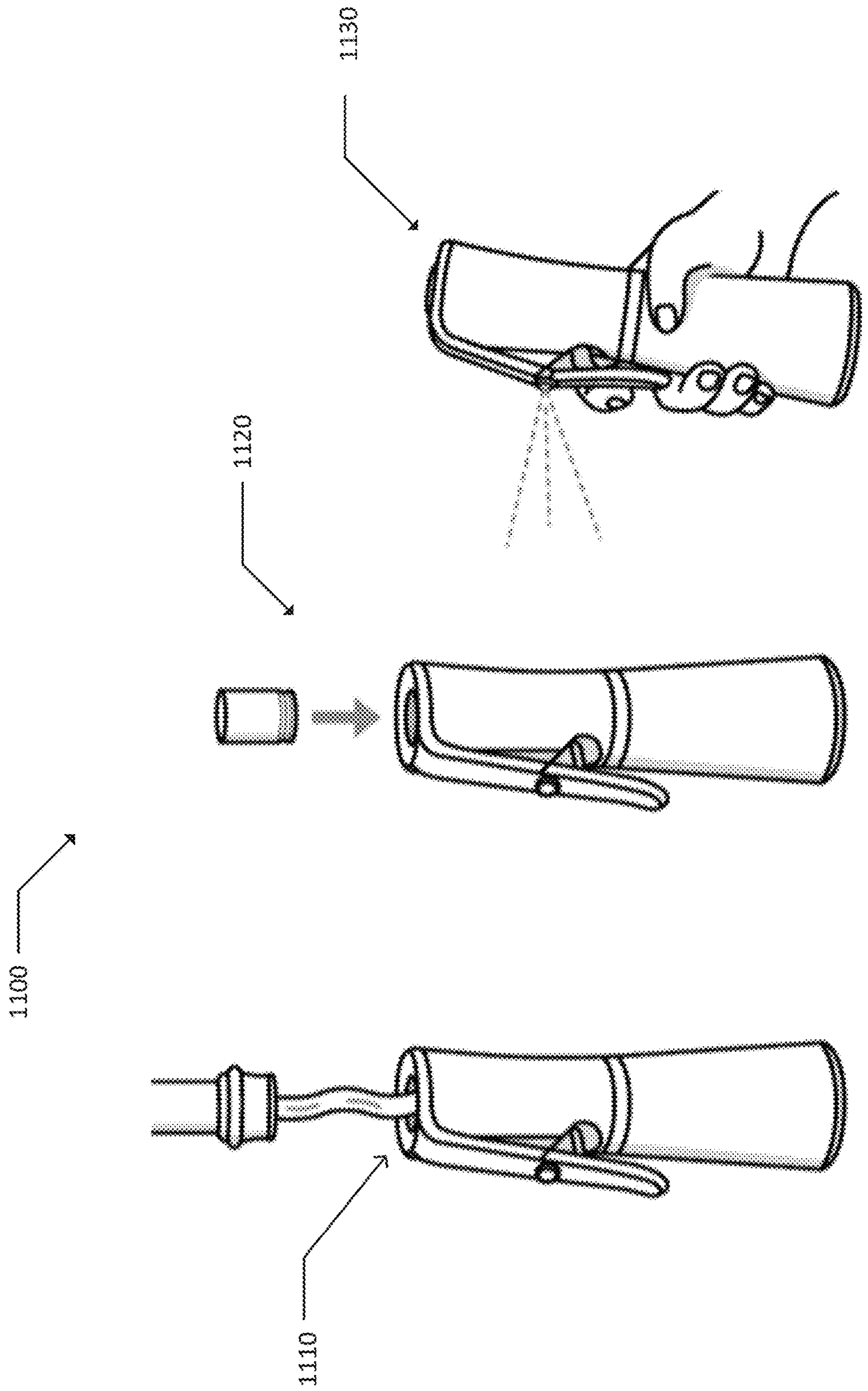
FIGS. 11A-11C illustrates example steps for making a cleaning solution in accordance with various embodiments of the present disclosure.

With reference to FIGS. 11A-11C, illustrates example steps on mixing one or more cleaning solutions. In various embodiments, as depicted in FIG. 11A, the dispenser 50 may be filled with a fluid 1110, wherein the fluid is configured to enter through the fill port. In various embodiments, the fluid may traverse from the fill port to the reservoir via a channel. In one or more example embodiments, a user may be able to determine when the reservoir has been completely filled, via a window element, wherein the window element comprises of a transparent material. In one or more example embodiments, the user may insert a pod 1120 into the recess of the housing body, wherein the recess may be the same hole as the fill port. In various embodiments, the pod may be configured to engage with one or more puncturing devices. In various embodiments, the puncturing devices pierce the pod, wherein the concentrated cleaning medium flows from within the pod through the channel to the reservoir. In one or more embodiments, the user may shake the dispenser to combine the fluid and the cleaning medium. In various embodiments, the cleaning solution may be expelled by a user 1130, via the activation of the trigger handle.

What is claimed is:

1. A dispenser comprising:

a housing body comprising:

a recess having a retaining-rejecting mechanism disposed therein, the retaining-ejecting mechanism configured to selectively retain a pod at least partially within the recess in a retained position and eject the pod from the retained position, wherein the retaining-ejecting mechanism comprises at least one seal configured to keep a concentrated cleaning medium within the pod from exiting the recess unintentionally;

a dispensing mechanism, configured for dispensing fluid from a reservoir of the dispenser; and a base body defining, at least in part, the reservoir configured for receiving and maintaining the fluid therein, wherein the recess is configured for the fluid to be provided to the reservoir through the recess without requiring disassembly of the dispenser.

2. The dispenser according to claim 1, the dispensing mechanism further comprising:

a housing;

a nozzle coupled to the housing and configured to dispense the fluid therethrough;

at least one pipette; and a trigger mechanism comprising:

a trigger handle, a trigger pivot point, a trigger spring, and a plunger mechanism, wherein the plunger mechanism is configured to:

force the fluid from a base coupled to the housing into a holding area upon release of the trigger handle, and force the fluid from the holding area, through an atomization area, and out of the nozzle upon activation of the trigger handle, wherein the trigger handle and the nozzle are disposed on opposite sides of the housing.

3. The dispenser according to claim 2, wherein the pipette is configured to translate to the base of the reservoir to transport the fluid.

4. The dispenser according to claim 3, wherein the pipette is configured to transport the fluid to the atomization area.

5. The dispenser according to claim 2, wherein the trigger mechanism is configured to pivot about a pin, wherein the pin is disposed below a lowermost edge of the nozzle.

6. The dispenser according to claim 1, further comprising a channel configured to transport the fluid to the reservoir through the recess.

7. The dispenser according to claim 1, wherein the retaining-rejecting mechanism further comprises:

at least one insert guide, wherein the at least one insert guide is configured to assist the insertion of the pod into the recess;

at least one spring; and at least one spring retainer, wherein the at least one spring retainer is configured to lock the at least one spring in place when pressed downwards a first time and release the at least one spring when pressed downwards a second time.

8. The dispenser according to claim 1, wherein the pod containing the concentrated cleaning medium is punctured via at least one puncturing device when inserted into the recess, wherein the at least one puncturing device is a sharp edge device.

9. The dispenser according to claim 8, wherein the puncturing of the pod releases the contained concentrated cleaning medium into the reservoir of the dispenser.

10. The dispenser according to claim 9, wherein the released concentrated cleaning medium is deconcentrated and/or diluted into a cleaning solution when mixed with the fluid in the reservoir.

11. The dispenser according to claim 10, wherein the dispenser is configured to expel the cleaning solution from the reservoir via at least one pipette.

12. The dispenser according to claim 1, the housing further comprising:

a viewing window, wherein the viewing window is configured to allow a user to determine a maximum fill of the reservoir with the fluid.

13. The dispenser according to claim 1, wherein the housing and the base are two separate bodies, wherein the two bodies comprise of one or more magnetic materials.

14. The dispenser according to claim 13, the base body further comprising:

a slip resistant material, wherein the material is configured to provide stability to the dispenser on surfaces.

15. The dispenser according to claim 13, wherein:

an attachment mechanism to attach a housing body to the base body is configured as part of a design of the housing, an attachment mechanism to attach the housing body to the base body is configured as part of the design of the base, and/or an attachment mechanism to attach the housing body to the base body is configured independently from either the design of the housing body and/or the design of the base body to operate as a singular mechanism configured to attach the housing body to the base body without regard to the design of the housing body and/or the design of the base body.

16. The dispenser according to claim 15, wherein the attachment mechanism is threaded, snap-fit, and/or magnetic.

17. A dispenser comprising:

a housing body comprising:

a recess having a retaining-rejecting mechanism disposed therein, the retaining-ejecting mechanism configured to selectively retain a pod at least partially within the recess in a retained position and eject the pod from the retained position, wherein the retaining-ejecting mechanism comprises at least one seal configured to keep a concentrated cleaning medium within the pod fluid from exiting the recess unintentionally;

a dispensing mechanism, configured for dispensing fluid from a reservoir of the dispenser; and a base body defining, at least in part, the reservoir configured for receiving and maintaining the fluid therein, wherein the recess is configured for the fluid to be provided to the reservoir through the recess without requiring disassembly of the dispenser, wherein the dispensing mechanism comprises:

a housing;

a nozzle coupled to the housing and configured to dispense the fluid therethrough;

at least one pipette; and a trigger mechanism comprising:

a trigger handle, a trigger pivot point, a trigger spring, and a plunger mechanism, wherein the plunger mechanism is configured to:

force the fluid from a base coupled to the housing into a holding area upon release of the trigger handle, and force the fluid from the holding area, through an atomization area, and out of the nozzle upon activation of the trigger handle.

18. The dispenser according to claim 17, wherein the pipette is configured to translate to the base of the reservoir to transport the fluid.

19. The dispenser according to claim 18, wherein the pipette is configured to transport the fluid to the atomization area.

20. The dispenser according to claim 17, wherein the trigger mechanism is configured to pivot about a pin, wherein the pin is disposed below a lowermost edge of the nozzle.

* * * * *